United States Patent
Chen et al.

(10) Patent No.: US 11,464,158 B2
(45) Date of Patent: Oct. 11, 2022

(54) OPPOSITE BELT-TYPE PRECISE SEEDING DEVICE

(71) Applicants: Shandong University of Technology, Shandong (CN); Zibo Hefeng Agricultural Technology Co., Ltd., Shandong (CN)

(72) Inventors: Yulong Chen, Shandong (CN); Longmei Zhang, Shandong (CN); Yubin Lan, Shandong (CN); Jianyong Li, Shandong (CN); Bing Wang, Shandong (CN); Yanfei Zhang, Shandong (CN); Duanyang Geng, Shandong (CN); Ruijun Liu, Shandong (CN); Huaqiang Zhang, Shandong (CN)

(73) Assignees: Shandong University of Technology, Zibo (CN); Hefeng Agricultural Technology Co., Ltd., Zibo (CN)

( * ) Notice: Subject to any disclaimer, the term of this patent is extended or adjusted under 35 U.S.C. 154(b) by 373 days.

(21) Appl. No.: 16/883,292

(22) Filed: May 26, 2020

(65) Prior Publication Data
US 2020/0375087 A1    Dec. 3, 2020

(30) Foreign Application Priority Data
May 28, 2019    (CN) .......................... 201910452178.2

(51) Int. Cl.
B65G 15/16    (2006.01)
A01C 7/16    (2006.01)
A01C 7/20    (2006.01)

(52) U.S. Cl.
CPC ................ *A01C 7/16* (2013.01); *A01C 7/206* (2013.01)

(58) Field of Classification Search
CPC ............................... B65G 15/14; B65G 15/16
(Continued)

(56) References Cited

U.S. PATENT DOCUMENTS

| 3,718,819 A | * | 2/1973 | Miksitz | .................. G01N 23/12 378/54 |
| 5,211,278 A | * | 5/1993 | Mendenhall | ......... B26D 7/0625 99/538 |

(Continued)

FOREIGN PATENT DOCUMENTS

CN    105850310 B  *  5/2018

*Primary Examiner* — Joseph A Dillon, Jr.
(74) *Attorney, Agent, or Firm* — ArentFox Schiff LLP; Michael Fainberg

(57) ABSTRACT

The present invention discloses an opposite belt-type precise seeding device. The opposite belt-type precise seeding device comprises a seed metering tube consisting of a U-shaped shell and a cover plate, two conveying devices provided inside the seed metering tube in parallel, and a conveying plate provided at the lower end of the seed metering tube. The opposite belt-type precise seeding device belongs to the field of agricultural machinery. In a seeder, a tubular seed conveying tube is usually used for guiding movement of seeds, but the movement of the seeds in the seed conveying tube has certain randomness, so that the seed distance consistency of the seeds in a seed bed is reduced. Through control of the seeds by the conveying devices, the stable movement of the seeds is achieved and the seed distance consistency of the seeds in the seed bed is guaranteed.

11 Claims, 4 Drawing Sheets

(58) Field of Classification Search
USPC ......... 198/626.1, 626.2, 626.3, 626.4, 626.5, 198/626.6
See application file for complete search history.

(56) References Cited

U.S. PATENT DOCUMENTS

| | | | | |
|---|---|---|---|---|
| 7,810,631 | B2* | 10/2010 | Kawakami | A23N 15/02 198/623 |
| 8,276,741 | B1* | 10/2012 | Zittel | B65G 47/24 198/380 |
| 8,307,974 | B2* | 11/2012 | Saunders | F04B 19/20 198/626.1 |
| 8,739,962 | B2* | 6/2014 | Bielenberg | B01J 8/003 198/604 |
| 8,893,878 | B2* | 11/2014 | Sprouse | C10J 3/78 110/284 |
| 8,939,278 | B2* | 1/2015 | Fitzsimmons | F27D 3/18 198/626.1 |
| 9,944,465 | B2* | 4/2018 | Saunders | B65G 15/14 |
| 10,485,159 | B2* | 11/2019 | Wilhelmi | A01C 7/20 |
| 10,582,655 | B2* | 3/2020 | Kowalchuk | A01C 21/007 |
| 10,842,072 | B2* | 11/2020 | Wilhelmi | A01C 7/20 |
| 11,057,964 | B2* | 7/2021 | Luo | H05B 6/103 |
| 2012/0186946 | A1* | 7/2012 | Saunders | F04B 19/20 198/626.1 |
| 2015/0353284 | A1* | 12/2015 | Sprouse | F04B 19/20 198/626.1 |
| 2021/0185900 | A1* | 6/2021 | Johnson | A01C 7/20 |

* cited by examiner

OPPOSITE BELT-TYPE PRECISE SEEDING DEVICE

CROSS-REFERENCE TO RELATED APPLICATIONS

This application claims priority to Chinese Patent Application No. 201910452178.2 filed on May 28, 2019, the entire contents of which is hereby incorporated by reference.

TECHNICAL FIELD

The present invention relates to the technical field of precise seed arrangement in the field of agricultural machinery, and in particular, to an opposite belt-type precise seeding device.

BACKGROUND

A seed metering device on a seeder is generally high in position. After leaving the seed metering device, the seed needs to go through a distance to fall to the seed bed. Generally, a tubular seed conveying tube is used for guiding movement of seeds, but the movement of the seeds in the seed conveying tube has certain randomness. The movement trajectory of the seed will change after the seed collides with the seed conveying tube, which will cause the movement direction and speed of the seeds to change, increasing the variation of the seed distance when the seed falls into the seed bed; the speed at which seeds fall into the seed bed after gravity acceleration in the process of falling is greater than the speed at which seeds leave the seed metering device. The greater the speed, the greater the jump of the seeds at the moment of contact with the ground, so that the seed distance consistency of the seeds in the seed bed is reduced. How to improve the consistency of the seeding speed and direction after seeds leave the seed metering device has become an urgent demand.

SUMMARY

The technical problem to be solved by the present invention is to provide an opposite-belt-type precise seeding device with better control of seed movement trajectory and seed distance consistency of seeds in the seed bed.

The technical solutions of the technical problem to be solved by the present invention are as follows:

An opposite belt-type precise seeding device, comprising a seed metering tube consisting of a U-shaped shell and a cover plate, wherein: two conveying devices are provided inside the seed metering tube in parallel, a conveying plate is provided at the lower part of the seed metering tube, the conveying device comprises a driving shaft, a driven shaft, and a conveyor belt, the driving shaft and the driven shaft are fixed at the upper part and the lower part in the seed metering tube through bearings, the conveyor belt is mounted on the driving shaft and the driven shaft, a gap is provided between adjacent surfaces of the conveyor belts of the two conveying devices for clamping seeds, at least one end of one driving shaft extends to the outside of the seed metering tube, the two driving shafts or the two driven shafts are provided with gears meshed with each other, and the upper part of the conveying plate is located between the two conveying belts.

More preferably, a soft layer consisting of fluff or a brush is provided on the outer side of the conveyor belt.

More preferably, the thickness of the soft layer is 5 to 10 mm.

More preferably, the distance between the upper parts of the gap between the two conveyor belts is greater than the distance between the lower parts.

More preferably, the maximum distance of the gap between the two conveyor belts 4 is 10 to 14 mm, and the minimum distance is 3 to 5 mm.

More preferably, the conveying plate comprises a guide plate located on the upper part and a V-shaped chute located on the lower part, and the connection between the guide plate and the chute is closely abutted to the lower part of the conveyor belt.

More preferably, the guide plate forms a shape that is wide at the top and narrow at the bottom, the edge of a part of the guide plate located between the two conveyor belts is parallel to the surface of the conveyor belt, and the edge of the guide plate is inserted into the soft layer.

More preferably, the guide plate is inserted into the soft layer with a depth of 1 to 2 mm.

The beneficial effects of the present invention areas follows.

The soft layer of the opposite conveyor belts installed at the bottom of the seed metering device is used to clamp the seeds thrown from the seed metering device. The cooperation of the conveyor belt and the conveying plate is used to send the seeds to the position closer to the seed bed at the same speed and trajectory. The present invention has the following advantages: 1. effectively protecting the seeds to avoid damage to the seeds caused by the impact inside the tube wall; 2. effectively controlling the movement trajectory and speed of the seeds, reducing the collision bounce between the seeds and the soil, and improving the seed distance consistency.

15, a chute; 14, a guide plate; 13, a soft layer; 6, a gear; 2, a bearing; 4, a conveyor belt; 8, a driven shaft; 7, a driving shaft; 9, a conveying plate; 1, a cover plate; 5, a U-shaped shell;

DETAILED DESCRIPTION

In order to make the technical solutions and beneficial effects of the present invention clearer, the embodiments of the present invention are explained in more detail below.

Figure 1:
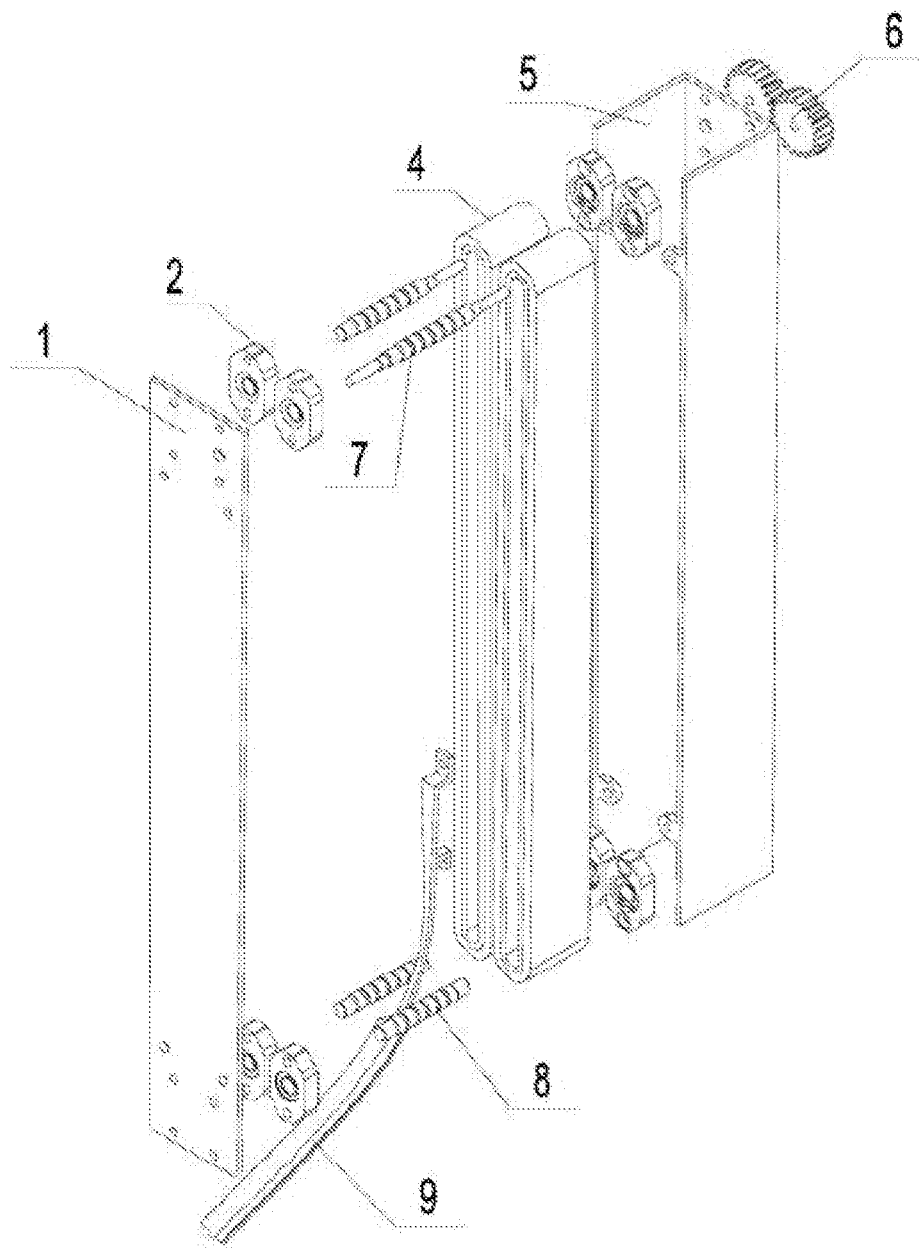
FIG. 1 is an exploded diagram of an embodiment of the present invention.

As shown in FIG. 1, an opposite belt-type precise seeding device comprises a seed metering tube, two conveying devices provided inside the seed metering tube, and a conveying plate 9 provided at the lower part of the seed metering tube. The upper end of the seed metering tube is connected or corresponding to the seed outlet of the seed metering device, and is used to catch the seeds from the seed outlet of the seed metering device to be poured into the seed bed through the seed metering tube. In order to stabilize the trajectory of the seeds, the trajectory change caused by hitting the inner wall of the seed metering tube is reduced. The seeds damage the providing of the conveying device, and enter the seed bed via the conveying device 9 after the speed limit and position limit conveying of the conveying device.

Figure 2:
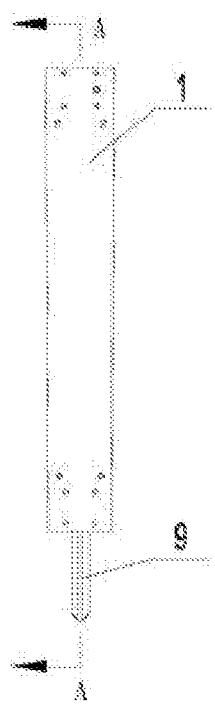
FIG. 2 is a front diagram of an embodiment of the present invention.

In order to facilitate maintenance, the seed metering tube is provided in a detachable structure, which comprises a U-shaped shell 5 and a cover plate 1. The cover plate 1 is covered at the opening of the U-shaped shell 5 to form a tubular structure. The cover plate 1 is screwed to the U-shaped shell 5. As shown in FIG. 2, the cover plate 1 is provided with a screw hole, and the U-shaped shell 5 is provided with a fixing bolt at the opening. The two positions correspond to each other and are screwed together. When maintenance is required, the screw is detached.

The conveying device uses a conveyor-type conveying mechanism. As shown in FIG. 1, the conveying device comprises a driving shaft 7, a driven shaft 8, and a conveyor belt 4. The driving shaft 7 and the driven shaft 8 are provided up and down, and are mounted on the upper part and the lower part of the inner tube wall of the seed metering tube through bearings 2. The conveyor belt 4 is mounted on the upper part of the driving shaft 7 and the driven shaft 8. The driving shaft 7 is linked with an external rotating mechanism, and drives the driven shaft 8 to rotate through the conveyor belt 4. Therefore, at least one end of the at least one driving shaft 7 extends to the outside of the seed metering tube and is connected to the external rotating mechanism. The two conveying devices are provided side by side inside the seed metering tube, and a gap is provided between adjacent surfaces of the conveying belt 4 of the two conveying devices. The gap between the adjacent surfaces of the conveyor belt 4 is used to clamp the seeds and drive the seeds to descend.

The two conveying devices may be provided in parallel, that means, the length directions of the two conveying devices are parallel to each other and parallel to the length direction of the seed metering tube. The gap between the two conveyor belts 4 of the two conveying devices is therefore equidistant.

More preferably, in order to better catch the seeds discharged from the seed outlet of the seed metering device, the gap between the two conveyor belts 4 is shaped like a cone with a large upper part and a small lower part, that means, the distance between the upper parts of the gap is larger than the distance between the lower parts. Preferably, the maximum distance of the gap between the two conveyor belts 4 is 10 to 14 mm, and the minimum distance is 3 to 5 mm.

Figure 3:
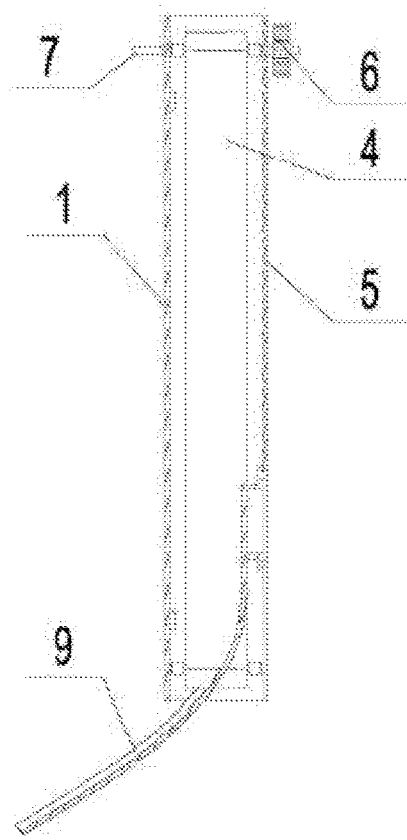
FIG. 3 is a cross-sectional diagram taken along the direction A in FIG. 2.
Figure 4:
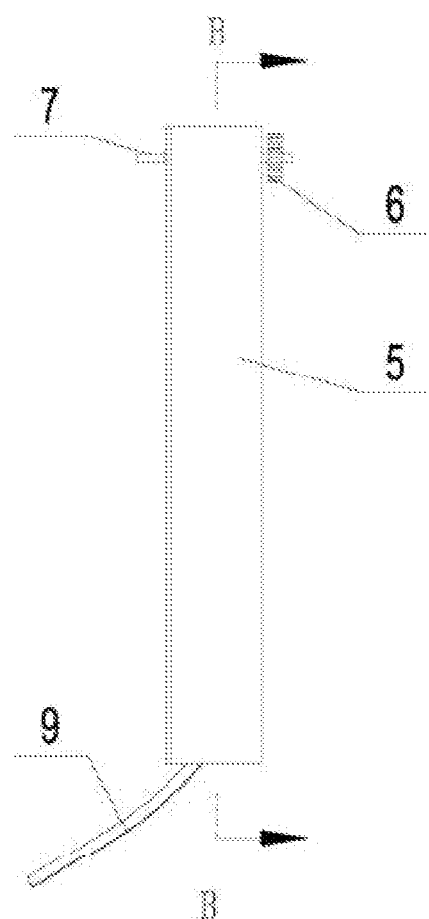
FIG. 4 is aside diagram of an embodiment of the present invention.
Figure 5:
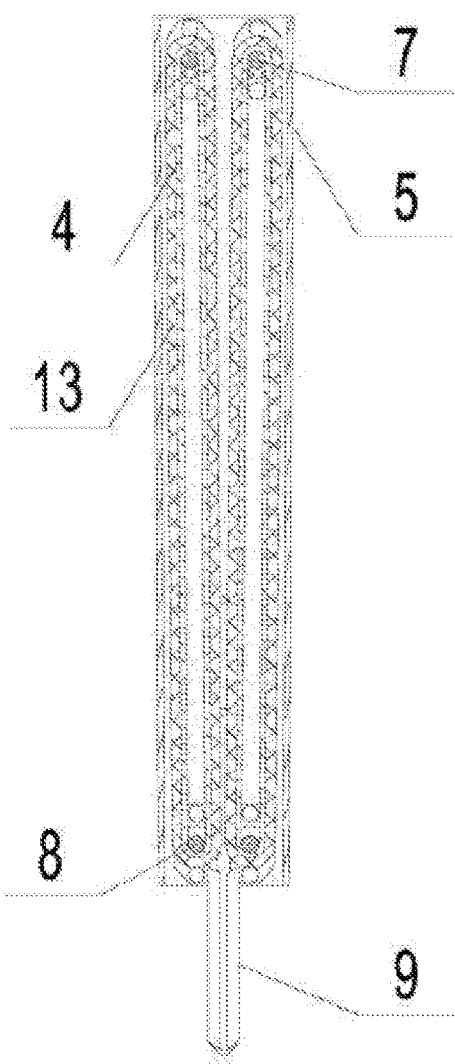
FIG. 5 is a cross-sectional diagram taken along the direction B in FIG. 4.

In order to achieve the descending of the seeds, the movement directions of the adjacent surfaces of the conveyor belt 4 of the conveying device must be the same. Therefore, the two driving shafts 7 or the two driven shafts 8 are provided with gears 6 meshed with each other. The gears 6 not only realize conveying between the two conveying devices, but also ensure that the movement directions of adjacent surfaces of the two conveying belts 4 are consistent. As shown in FIGS. 1, 3 and 4, as a preferred solution, the gears 6 are provided outside the seed metering tube, so as to prevent the seeds from being crushed and damaged due to being provided inside the seed metering tube. At the same time, a soft layer is provided on the outer surface of the conveyor belt 4, which can reduce the crushing of the seeds by the two conveyor belts, especially near the two driving shafts 7 or near the two driven shafts 8, that means, at the position of the upper end and the lower end of the gap, so as to achieve better protection of the seeds.

More preferably, in order to better clamp and protect the seeds, a soft layer 13 consisting of fluff or a brush is provided on the outer side of the conveyor belt 4. In addition, the thickness of the soft layer 13 is provided as 5010 mm so as to clamp seeds of various sizes.

The conveying plate 9 is used to pour the seeds conveyed by the conveying device into the seed bed. The conveying plate 9 is inclined or designed in an arc shape. The upper part of the conveying plate 9 is located inside the seed metering tube and inside the gap between the two conveying belts 4. A seed metering tube is protruded from the lower part of the conveying plate 9.

Figure 6:
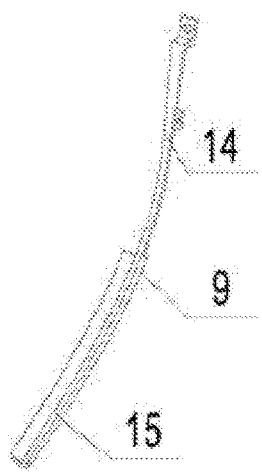
FIG. 6 is a schematic diagram of a conveying plate according to an embodiment of the present invention.

More preferably, as shown in FIG. 6, the conveying plate 9 comprises a guide plate 14 located on the upper part and a V-shaped chute 15 located on the lower part. The connection between the guide plate 14 and the chute 15 is closely abutted to the lower part of the conveyor belt 4. The guide plate 14 is sandwiched inside the gap between the two conveyor belts 4. After the seeds fall to the position of the guide plate 14, the guide plate 14 changes the movement trajectory of the seeds. After entering the chute 15, the chute is V-shaped. Therefore, the trajectory of the seeds can be better defined. Inside the seed metering tube, the trajectory of the seeds is defined by the conveyor belt 4 and the guide plate 14. Outside the seed metering tube, the V-shaped chute 15 can define the movement trajectory of the seeds. Therefore, during the entire movement of the seeds, the controllability of its movement trajectory can be realized.

More preferably, in order to accommodate the design that the gap between the conveyor belts 4 of the conveying device has a large upper part and a smaller lower part, the guide plate 14 also forms a shape that is wide at the top and narrow at the bottom. Moreover, the edge of a part of the guide plate 14 located between the two conveyor belts 4 is parallel to the surface of the conveyor belt 4. More preferably, if the outer surface of the conveyor belt 4 is provided with a soft layer, the edge of the guide plate 14 can be inserted into the soft layer 13.

More preferably, the guide plate 14 is inserted into the soft layer 13 with a depth of 1 to 2 mm.

The working principle of the present invention is as follows.

The present invention is installed at the lower part of the seed metering device, the upper end of the gap between the two conveyor belts inside the seed metering tube corresponds to the seed outlet of the seed metering device, and the driving shaft of the present invention is linked with the rotating mechanism of the seed metering device. After the seeds come out of the seed outlet, the seeds enter the seed metering tube, fall into the gap, and are clamped by the conveyor belt 4 or the soft layer on the conveyor belt 4. At this time, the seeds lose their original falling speed and follow the conveyor belt to move downward. Due to the linkage of the gears 6, the rotation directions of the two conveyor belts are opposite, and the movement directions of the two conveyor belts forming the gap at one side are the same, so that the seeds can be lamped to move downward. After reaching the position of the conveying plate, the seeds are guided by the conveying plate 9 into the seed bed. Since the rotation speed of the conveyor belt 4 is constant, it is possible to guarantee the seed distance consistency of the seeds in the seed bed.

In summary, the above description is merely a preferred embodiment of the present invention and is not intended to limit the scope of the present invention. Through the above description, relevant workers can make various changes and modifications without departing from the technical idea of the present invention. The technical scope of the present invention is not limited to the content of the specification, and all the equivalent changes and modifications in shape, structure and feature described in the scope of the claims of the present invention shall be included in the scope of the claims of the present invention.

The invention claimed is:

1. An opposite belt-type precise seeding device, comprising a seed metering tube consisting of a U-shaped shell and a cover plate, wherein:
   two conveying devices are provided inside the seed metering tube in parallel, and a conveying plate is provided at the lower part of the seed metering tube,
   each conveying device comprises a driving shaft, a driven shaft, and a conveyor belt,
   the driving shaft and the driven shaft are fixed at the upper part and the lower part in the seed metering tube through bearings,
   each conveyor belt is mounted on the driving shaft and the driven shaft,
   a gap is provided between adjacent surfaces of the conveyor belts of the two conveying devices for clamping seeds,
   at least one end of one driving shaft extends to the outside of the seed metering tube,
   the two driving shafts or the two driven shafts are provided with gears meshed with each other, and
   the upper part of the conveying plate is located between the two conveying belts.

2. The opposite belt-type precise seeding device according to claim 1, wherein:
   a soft layer consisting of fluff or a brush is provided on the outer side of the conveyor belt.

3. The opposite belt-type precise seeding device according to claim 2, wherein:
   the thickness of the soft layer is 5 to 10 mm.

4. The opposite belt-type precise seeding device according to claim 1, wherein:
   the distance between the upper parts of the gap between the two conveyor belts is greater than the distance between the lower parts.

5. The opposite belt-type precise seeding device according to claim 4, wherein:
   the maximum distance of the gap between the two conveyor belts is 10 to 14 mm, and the minimum distance is 3 to 5 mm.

6. The opposite belt-type precise seeding device according to claim 1, wherein:
   the conveying plate comprises a guide plate located on the upper part and a V-shaped chute located on the lower part, and the connection between the guide plate and the chute is closely abutted to the lower part of the conveyor belt.

7. The opposite belt-type precise seeding device according to claim 2, wherein:
   the conveying plate comprises a guide plate located on the upper part and a V-shaped chute located on the lower part, and the connection between the guide plate and the chute is closely abutted to the lower part of the conveyor belt.

8. The opposite belt-type precise seeding device according to claim 6, wherein:
   the guide plate forms a shape that is wide at the top and narrow at the bottom, the edge of a part of the guide plate located between the two conveyor belts is parallel to the surface of the conveyor belt, and the edge of the guide plate is inserted into a soft layer.

9. The opposite belt-type precise seeding device according to claim 7, wherein:
   the guide plate forms a shape that is wide at the top and narrow at the bottom, the edge of a part of the guide plate located between the two conveyor belts is parallel to the surface of the conveyor belt, and the edge of the guide plate is inserted into the soft layer.

10. The opposite belt-type precise seeding device according to claim 8, wherein:
    the guide plate is inserted into the soft layer with a depth of 1 to 2 mm.

11. The opposite belt-type precise seeding device according to claim 9, wherein:
    the guide plate is inserted into the soft layer with a depth of 1 to 2 mm.

* * * * *